United States Patent
Krueckels et al.

(10) Patent No.: US 8,182,225 B2
(45) Date of Patent: May 22, 2012

(54) BLADE FOR A GAS TURBINE

(75) Inventors: Joerg Krueckels, Birmenstorf (CH); Roland Dueckershoff, Hoehr-Grenzhausen (DE); Martin Schnieder, Ennetbaden (CH)

(73) Assignee: AlstomTechnology Ltd, Baden (CH)

( * ) Notice: Subject to any disclaimer, the term of this patent is extended or adjusted under 35 U.S.C. 154(b) by 0 days.

(21) Appl. No.: 12/876,602

(22) Filed: Sep. 7, 2010

(65) Prior Publication Data

US 2011/0085915 A1 Apr. 14, 2011

Related U.S. Application Data

(63) Continuation of application No. PCT/EP2009/051846, filed on Feb. 17, 2009.

(30) Foreign Application Priority Data

Mar. 7, 2008 (CH) ........................ 0351/08

(51) Int. Cl.
*F01D 5/18* (2006.01)
(52) U.S. Cl. ..................................... 416/97 R
(58) Field of Classification Search ................. 416/97 R
See application file for complete search history.

(56) References Cited

U.S. PATENT DOCUMENTS

| | | | |
|---|---|---|---|
| 3,885,609 A | 5/1975 | Frei et al. | |
| 4,019,831 A | 4/1977 | Franklin et al. | |
| 4,180,373 A | 12/1979 | Moore et al. | |
| 4,278,400 A | 7/1981 | Yamarik et al. | |
| 4,515,523 A * | 5/1985 | North et al. | 416/97 R |
| 5,288,207 A * | 2/1994 | Linask | 416/97 R |
| 5,503,529 A | 4/1996 | Anselmi et al. | |
| 5,738,493 A | 4/1998 | Lee et al. | |
| 5,813,835 A | 9/1998 | Corsmeier et al. | |
| 6,402,471 B1 * | 6/2002 | Demers et al. | 416/97 R |
| 6,481,966 B2 | 11/2002 | Beeck et al. | |

(Continued)

FOREIGN PATENT DOCUMENTS

EP  1 113 145 A  7/2001

(Continued)

OTHER PUBLICATIONS

International Search Report from PCT/EP2009/051846 dated Apr. 1, 2009.

*Primary Examiner* — Richard Edgar
(74) *Attorney, Agent, or Firm* — Leydig, Voit & Mayer, Ltd.

(57) ABSTRACT

A blade for a gas turbine includes a leading edge running in a longitudinal direction substantially radially to an axis of the turbine; a trailing edge running in the longitudinal direction; a blade body disposed between the leading edge and the trailing edge so as to define a pressure side and a suction side; an exit slot disposed in the blade body in an area of the trailing edge and running in the longitudinal direction and configured to discharge a cooling medium from an interior of the blade body; and a row of first and second control elements disposed in the exit slot in a distributed manner in the longitudinal direction and configured to control a mass flow of the cooling medium exiting through the exit slot, the first control elements having a first configuration and the second control elements having a second configuration different from the first configuration.

8 Claims, 4 Drawing Sheets

U.S. PATENT DOCUMENTS

| | | | |
|---|---|---|---|
| 7,731,481 B2 * | 6/2010 | Cunha et al. | 416/97 R |
| 2002/0150468 A1 * | 10/2002 | Tiemann | 416/97 R |
| 2005/0232770 A1 | 10/2005 | Rawlinson et al. | |
| 2006/0222497 A1 * | 10/2006 | Lee | 416/97 R |

FOREIGN PATENT DOCUMENTS

| | | |
|---|---|---|
| EP | 1 205 634 A | 5/2002 |
| EP | 1 707 741 A | 10/2006 |
| EP | 1 749 972 A | 2/2007 |
| EP | 1 849 960 A | 10/2007 |
| EP | 1 849 961 A | 10/2007 |
| EP | 1 918 522 A | 5/2008 |
| GB | 2 112 467 A | 7/1983 |
| GB | 2 349 920 A | 11/2000 |
| JP | 58167806 A * | 10/1983 |
| JP | 11311102 A * | 11/1999 |

* cited by examiner

BLADE FOR A GAS TURBINE

CROSS REFERENCE TO PRIOR APPLICATIONS

This application is a continuation of International Patent Application No. PCT/EP2009/051846, filed Feb. 17, 2009, which claims priority to Swiss Application No. CH 00351/08, filed Mar. 7, 2008. The entire disclosure of both applications is incorporated by reference herein.

FIELD

The present invention relates to the field of gas turbines. It concerns a blade for a gas turbine.

BACKGROUND

At the high gas temperatures at which gas turbines of the modern generation are operated, it is essential for the guide and moving blades of the turbine that are used there to be cooled. To this end, a gaseous cooling medium is used, for example a compressed air quantity branched off from the compressor of the gas turbine at a suitable point, and/or sometimes steam, in particular if the gas turbine is part of a combined-cycle power plant, or otherwise when steam is available in suitable quality and quantity. This cooling medium is directed through cooling channels arranged in the blade and frequently running in serpentine shapes, this being effected via an open and/or closed cooling path. The cooling medium is also often discharged outward through corresponding openings (holes, slots) at various points of the blade in order to achieve a cooling effect, in particular on the outer side of the blade, by the film cooling forming there. An example of such a cooled blade is described and shown in the publication U.S. Pat. No. 5,813,835.

Within the scope of blade cooling, the trailing edge of the blade must also often be subjected to cooling by cooling medium being discharged through a slot-shaped opening arranged in front of the trailing edge and running substantially parallel to the trailing edge, the cooling medium then sweeping over the trailing edge and that region of the blade surface which lies between the opening and the trailing edge. Such cooling of the trailing edge is shown in FIG. 3 of U.S. Pat. No. 5,813,835 with the reference numerals 208 and 210.

The basic geometry of the trailing edge cooling is reproduced in a highly simplified form in FIG. 1. The blade 10, which extends in a longitudinal direction, that is to say in a radial direction with respect to the turbine axis, and which ends in a blade tip 12, has a leading edge 11 upstream and a trailing edge 13 downstream. Between leading edge 11 and trailing edge 13, the blade, with a wing profile, forms a pressure side 23 and a suction side 24.

An exit slot 14 for a cooling medium (in particular cooling air) is provided on the pressure side 23 in front of the trailing edge 13 and runs parallel thereto, through which exit slot 14 the cooling medium discharges outward and sweeps as cooling flow 16 over the trailing edge 13. The cooling medium is fed to the exit slot 14 through a cooling channel 15 in the interior of the blade 10. Arranged in a distributed manner in the longitudinal direction in the exit slot 14 are control elements 17, through which firstly the cross-sectional area of the exit slot 14 is reduced (that is to say controlled) and secondly the cooling medium is distributed over the entire length of the exit slot 14.

The significance of the control elements 17 for the control of the cooling flow 16 and thus also for the efficiency of the gas turbine overall is the subject matter of another publication, namely US-A1-2005/0232770. Control elements ("control features") of varying configuration in the exit slot are proposed in this publication, which control elements are intended to further reduce the cross-sectional area of the exit slot achievable by a casting process but at the same time also help to increase the mechanical stability of the slot region. Depending on the edge contour of the control elements 17, the cooling flow 16 in this case can be laminar or turbulent.

This reduction in the trailing edge cooling flow by obstacles or control elements arranged in the slot is always disadvantageous when the cooling flow 16 flows out with a moderate or low mass flow. In such a case, converging jet configurations 18 form in the cooling flow at the outlet of the exit slot according to FIG. 2, and generated in said jet configurations 18 are intermediate areas 19 which are cooled to a lesser extent and are thus subjected to higher temperatures. However, the reason for the low mass flow can be seen in the fact that recycled air is used.

SUMMARY OF THE INVENTION

The invention envisages a remedy for these problems. An aspect of the invention is to propose a gas turbine blade which avoids the described disadvantages of the known blades and is distinguished in particular by uniform cooling over the area of the trailing edge even at low mass flows of the cooling medium.

In an embodiment of the invention a sequence of differently configured control elements is provided in the row or constellation of the control elements. The row of differently configured control elements performs in particular two functions:

Firstly, they block the cooling flow exiting through the exit slot to the extent that the mass flow is specifically influenced in a controlled manner.

Secondly, they provide for a uniformly distributed cooling flow in order to thereby ensure good coverage of the area between exit slot and trailing edge with a cooling medium film.

One configuration of the invention is characterized in that at least two designs of control elements having a different cross-sectional contour are provided in the row of control elements, in that the one design of the at least two designs of control elements has an elongated, in particular drop-shaped, cross-sectional form extending in the direction of flow of the cooling medium, and in that the other design of the at least two designs of control elements has a substantially circular cross-sectional form. Laboratory tests have confirmed that such an arrangement has proved extremely effective.

In particular, the two designs of control elements can in this case be arranged alternately in the row. However, it is also conceivable for there to be arranged between two control elements of the one design a plurality of control elements of the other design in the row. In particular, there can be arranged between two control elements of the one design two or three control elements of the other design in the row.

BRIEF DESCRIPTION OF THE DRAWINGS

The invention is to be explained in more detail below with reference to exemplary embodiments in connection with the drawing. All the elements not required for directly understanding the invention have been omitted. The same elements are provided with the same reference numerals in the various figures. The direction of flow of the media is indicated by arrows.

In the drawing.

DETAILED DESCRIPTION

Various embodiments of the throttling of the cooling medium flow for the trailing edge of a gas turbine blade according to the invention are shown in FIGS. 3-6. All the exemplary embodiments have in common the fact that two special designs of control elements (throttle elements) 21 and 22 are used. The control element 21 has a drop-shaped edge contour and the control element 22 has a circular edge contour, wherein it should at the same time be noted that the two edge contours or cross-sectional areas shown are not exclusive.

Figure 3:
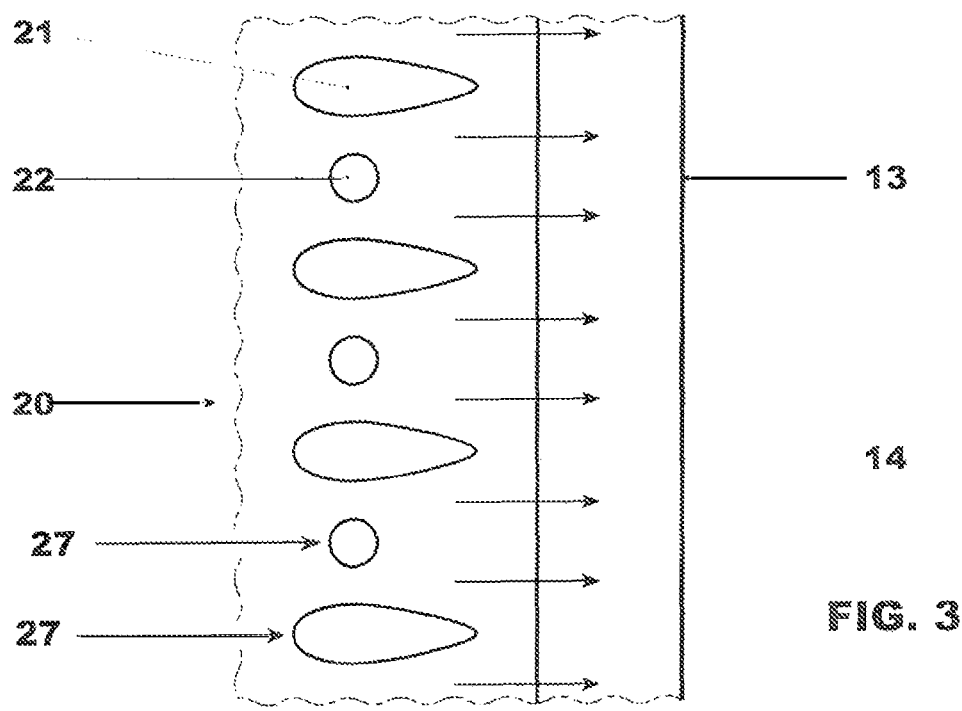
FIG. 3 shows a first exemplary embodiment for an arrangement of different control elements, reducing the mass flow, according to the invention, with two control element designs in a simple alternating arrangement.

In the blade 20 of the exemplary embodiment which can be seen in FIG. 3, the two control element designs 21 and 22 are arranged alternately (in an alternating manner) in the exit slot 14.

Figure 4:
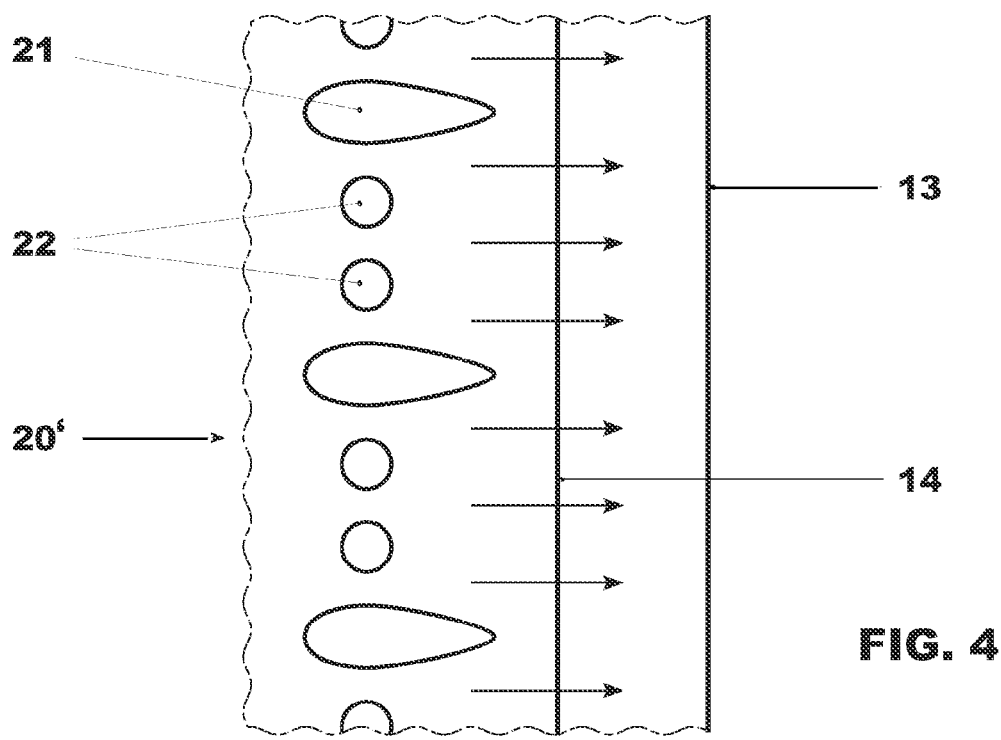
FIG. 4 shows a second exemplary embodiment for an arrangement of different control elements, reducing the mass flow, according to the invention, with two control element designs in an alternating arrangement which repeats itself after 3 elements in each case.

In the blade 20' of the exemplary embodiment which can be seen in FIG. 4, the two control element designs 21 and 22 are arranged alternately in the exit slot 14 in such a way that the sequence is repeated after three elements. Here, two control elements 22 of the circular design are provided in each case between two control elements 21 of the drop-shaped design.

Figure 5:
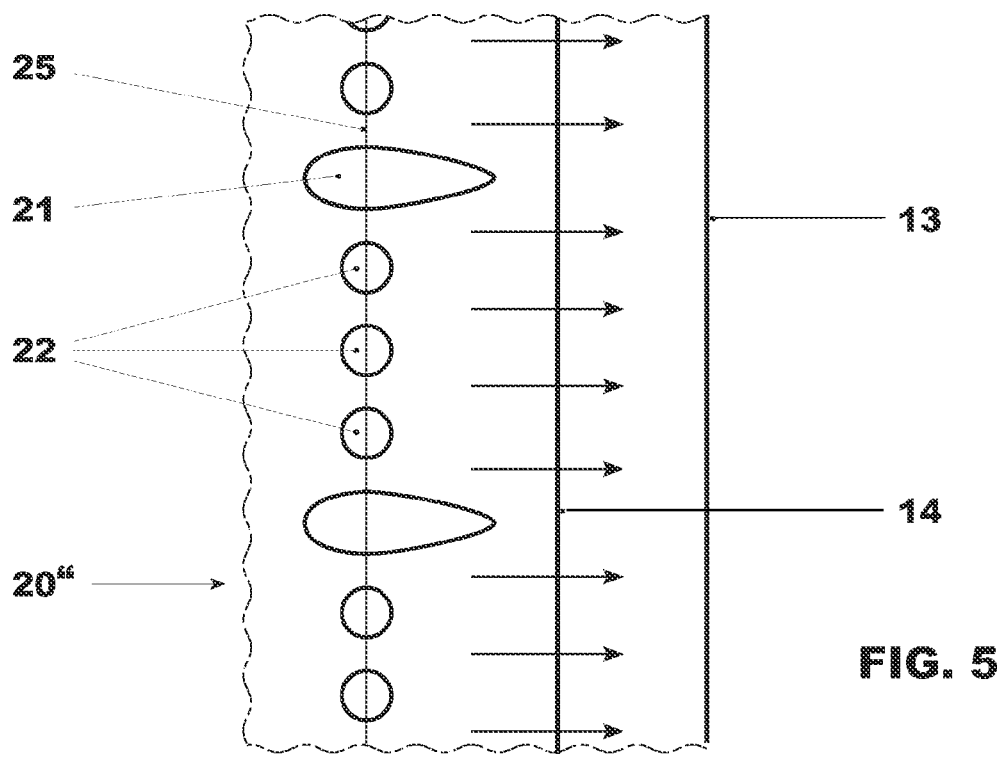
FIG. 5 shows a third exemplary embodiment for an arrangement of different control elements, reducing the mass flow, according to the invention, with two control element designs in an alternating arrangement which repeats itself after 4 elements in each case.

In the blade 20" of the exemplary embodiment which can be seen in FIG. 5, the two control element designs 21 and 22 are arranged alternately in the exit slot 14 in such a way that the sequence is repeated after four elements. Here, three control elements 22 of the circular design are provided in each case between two control elements 21 of the drop-shaped design. In FIG. 5, an auxiliary line 25 indicates the local position of the individual control elements 21, 22 in the direction of flow. In this case, said control elements 21, 22 are arranged in such a way that the largest cross-sectional areas of all the control elements, irrespective of their design, lie in a plane in the direction of flow, as the auxiliary line 25 is intended to signify, i.e. the smallest space between two control elements coincides with the plane of their largest cross-sectional area, thereby avoiding fluidic disturbance of the flow through the one space by the flow through the adjacent space, thus, for example, by converging or deflected flow structures, and thus stable area coverage of the cooling flow is achieved. These considerations also apply to the other figures of this description, in which the auxiliary line 25 has not been specifically shown.

Figure 6:
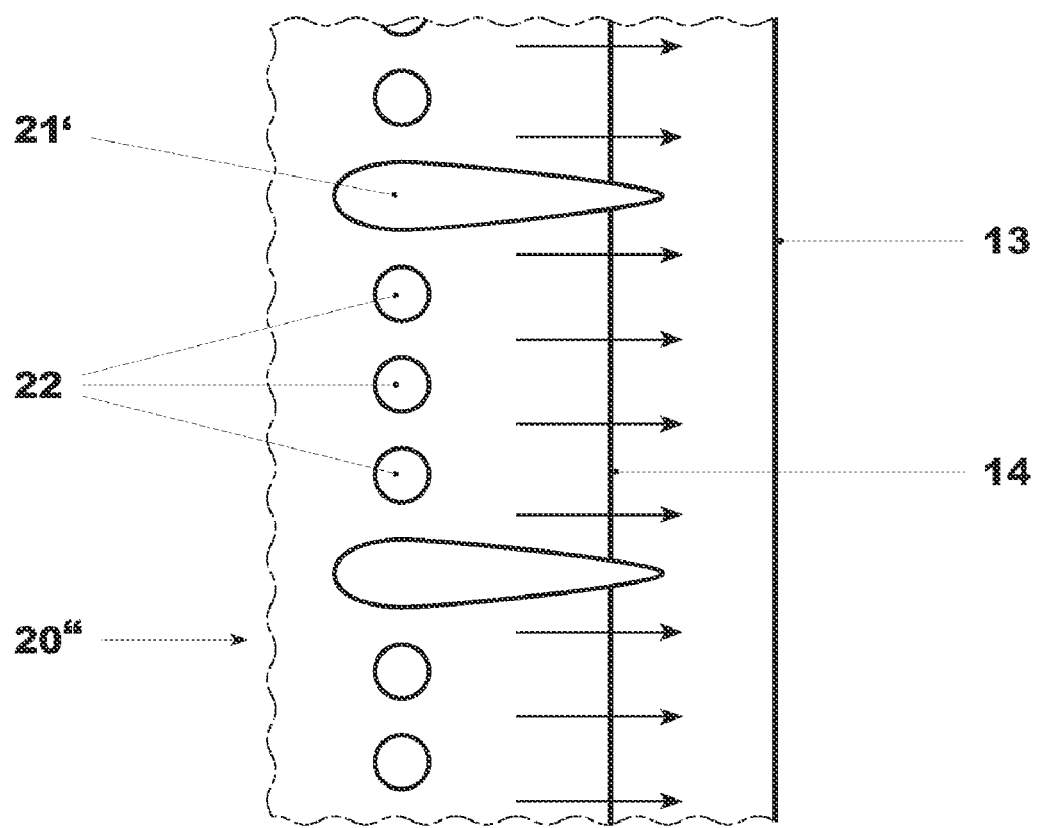
FIG. 6 shows a further exemplary embodiment for an arrangement of different control elements, reducing the mass flow, according to the invention, with two control element designs in a specific alternating arrangement, wherein the drop-shaped control elements extend beyond the exit slot.

FIG. 6 shows a configuration which differs from the preceding FIG. 5. In FIG. 6, the drop-shaped control elements 21' now extend beyond the exit slot 14. This configuration is justified in the case of certain flow characteristics where the neutralization of flow instabilities is concerned.

Figure 1:
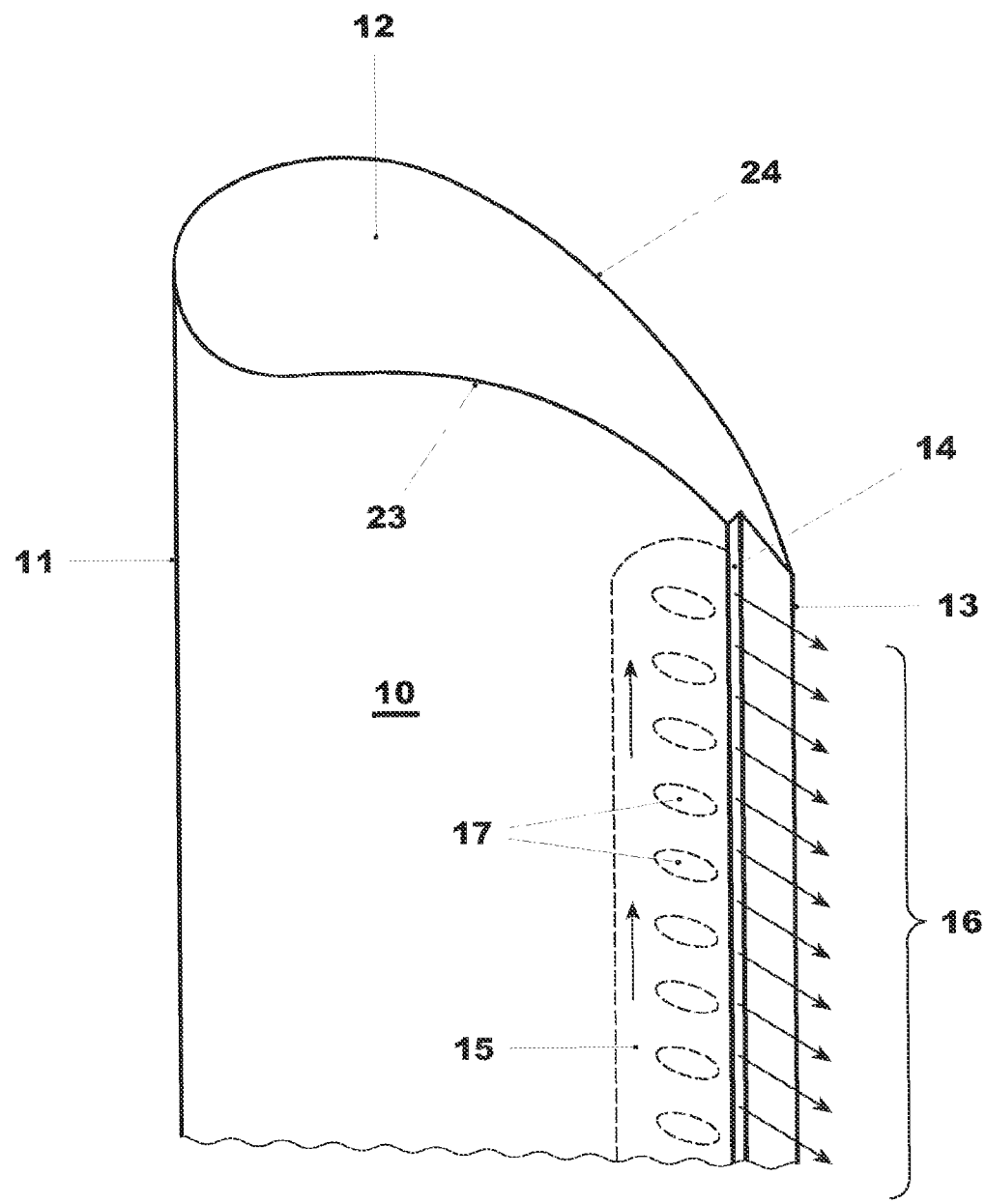
FIG. 1 shows in a simplified perspective illustration the part of a gas turbine blade with cooling of the trailing edge by an exit slot arranged in front of it according to the prior art.
Figure 2:
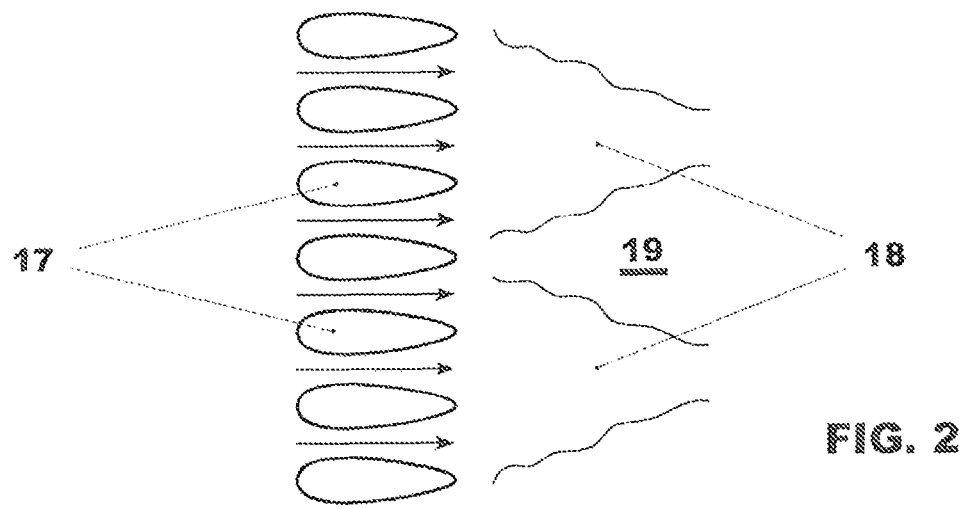
FIG. 2 shows in a schematic illustration the adverse effects with the known trailing edge cooling.

Converging jet configurations 18 as shown in FIG. 2 are reliably avoided by these alternating arrangements. In this case, the control elements 21, 22 perform their function irrespective of the direction of incidence of the cooling medium on the inner side of the exit slot 14, and so the configurations shown in FIGS. 3-6 can also be used in blades having radially oriented cooling channels in a serpentine shape.

The control elements 21, 22 described can also be designed in such a way that they need not occupy the entire cross-sectional width of the exit slot 14, i.e. some or more of these control elements 21, 22 have an air gap 27 relative to the one through-flow wall of the exit slot 14 along their head-side cross-sectional area. In such a configuration, the exiting cooling flow 16 can therefore not only flow outward around the edge contour of the individual control elements 21, 22 but can also flow out through the existing open air gap 27 along the head-side cross-sectional area of these control elements 21, 22. Here, too, different constellations can be provided in the row of the control elements 21, 22 with regard to the number and sequence of the air gaps 27 to be provided, this also applying to the individual thickness of the air gap 27. If necessary, these provisions can help to achieve the object.

On the whole, the described alternating arrangement of differently configured throttle elements can be used wherever a comparatively low mass flow of the cooling medium is to flow out at the trailing edge of a blade, namely:

in the case of guide or moving blades with cooling close to the wall, in the case of components in which recycled cooling air is used, in the case of stages of the gas turbine which are to be cooled subsequently and which have an annular opening or possibly exit slots or similar exit openings.

As far as the cross-sectional narrowing of the exit slot 14 by the control elements 21, 21', 22 provided there is concerned, this narrowing varies between 20% and 90%, depending on the respective conditions to be fulfilled with respect to the cooling of the trailing edge of the blade.

| List of Reference Numerals | |
|---|---|
| 10 | Blade (gas turbine) |
| 11 | Leading edge |
| 12 | Blade tip |
| 13 | Trailing edge |
| 14 | Exit slot |
| 15 | Cooling channel |
| 16 | Cooling flow |
| 17 | Control element (e.g. drop-shaped) |
| 18 | Jet configuration |
| 19 | Intermediate area |
| 20, 20', 20" | Blade (gas turbine) |
| 21, 21', 22 | Control element |
| 23 | Pressure side (blade) |
| 24 | Suction side (blade) |
| 25 | Auxiliary line |

What is claimed is:

1. A blade for a gas turbine comprising:
a leading edge running in a longitudinal direction substantially radially to an axis of the turbine;
a trailing edge running in the longitudinal direction;
a blade body disposed between the leading edge and the trailing edge so as to define a pressure side and a suction side;
an exit slot disposed in the blade body in an area of the trailing edge and running in the longitudinal direction and configured to discharge a cooling medium from an interior of the blade body; and
a row of first and second control elements disposed in the exit slot in a distributed manner so as to alternate, one after the other, between the first and second control elements in the longitudinal direction and configured to control a mass flow of the cooling medium exiting through the exit slot, the first control elements having a first edge contour and the second control elements having a second edge contour different from the first edge contour
wherein the largest cross-sectional area of each of the first control elements is larger than the largest cross-sectional area of each of the second control elements, and the largest cross-sectional area of each of the first control elements and the second control elements lie in a single plane extending across the exit slot.

2. The blade as recited in claim 1, wherein the first cross-sectional contour includes an elongated cross-sectional form extending in a direction of flow of the cooling medium, and wherein the second cross-sectional contour includes a substantially circular cross-sectional form.

3. The blade as recited in claim 2, wherein the elongated cross-sectional form includes a drop-shape extending beyond the exit slot.

4. The blade as recited in claim 1, wherein the exit slot is disposed at a distance in front of the trailing edge.

5. The blade as recited in claim 4, wherein the exit slot is disposed on the pressure side.

6. The blade as recited in claim 1 wherein the exit slo; includes a through-flow wall and wherein at least one of the first and the second control elements is formed with a head-side gap disposed opposite the through-tlow wall relative to a cross- sectional width of the exit slot.

7. The blade as recited in claim 6, wherein the air gap has a varying thickness along the row.

8. The blade as recited in claim 1, wherein the first and second control elements cause a cross-sectional narrowing of the mass flow through the exit slot of between 20% and 90%.

* * * * *